(12) United States Patent
Higano et al.

(10) Patent No.: US 11,976,970 B2
(45) Date of Patent: May 7, 2024

(54) OPTICAL SENSOR AND DISPLAY DEVICE

(71) Applicant: Japan Display Inc., Tokyo (JP)

(72) Inventors: Toshiyuki Higano, Tokyo (JP); Yasushi Tomioka, Tokyo (JP); Kazuhiro Nishiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/656,281

(22) Filed: Mar. 24, 2022

(65) Prior Publication Data
US 2022/0214215 A1 Jul. 7, 2022

Related U.S. Application Data

(63) Continuation of application No. PCT/JP2020/035042, filed on Sep. 16, 2020.

(30) Foreign Application Priority Data

Oct. 1, 2019 (JP) .................... 2019-181626

(51) Int. Cl.
*G01J 3/02* (2006.01)
*G01J 3/26* (2006.01)
*G06V 40/13* (2022.01)

(52) U.S. Cl.
CPC ............ *G01J 3/021* (2013.01); *G01J 3/0208* (2013.01); *G01J 3/26* (2013.01); *G06V 40/1318* (2022.01)

(58) Field of Classification Search
CPC .. G01J 3/021; G01J 3/0208; G01J 3/26; G01J 3/36; G06V 40/1318; G02B 5/28; G02B 26/00; G02F 1/1333; G06F 3/042; G09G 3/20; H04N 25/70
See application file for complete search history.

(56) References Cited

U.S. PATENT DOCUMENTS

| | | | |
|---|---|---|---|
| 10,101,205 B2 * | 10/2018 | Kasahara | G01J 3/027 |
| 2009/0296032 A1 | 12/2009 | Tago | |
| 2010/0289784 A1 * | 11/2010 | Fujioka | G06F 3/042 |
| | | | 345/207 |
| 2012/0109584 A1 * | 5/2012 | Urushidani | G01J 3/26 |
| | | | 702/189 |

(Continued)

FOREIGN PATENT DOCUMENTS

| | | |
|---|---|---|
| JP | 04-213287 A | 8/1992 |
| JP | 2018-200183 A | 12/2018 |
| JP | 2019-133076 A | 8/2019 |

OTHER PUBLICATIONS

International Search Report dated Dec. 1, 2020 in PCT/JP2020/035042 filed on Sep. 16, 2020, 3 pages.

(Continued)

*Primary Examiner* — Grant Sitta
(74) *Attorney, Agent, or Firm* — Maier & Maier, PLLC

(57) ABSTRACT

An optical sensor includes at least one interferometer having a pair of semi-transparent mirrors spaced apart and oppositely arranged, and at least one position of the pair of semi-transparent mirrors can be displaced, at least one collimating element overlapping the at least one interferometer, and at least one photoelectric conversion element having sensitivity in the visible and near infrared light bands and receiving light passing through the interferometer and the collimating element.

20 Claims, 17 Drawing Sheets

(56) References Cited

U.S. PATENT DOCUMENTS

| | | | | |
|---|---|---|---|---|
| 2016/0054179 A1* | 2/2016 | Carr | ..................... | A61B 5/0075 |
| | | | | 356/454 |
| 2016/0123808 A1* | 5/2016 | Obermueller | ............. | G01J 3/26 |
| | | | | 356/326 |
| 2017/0363469 A1* | 12/2017 | Sabry | ................... | G01J 3/0229 |
| 2018/0087962 A1* | 3/2018 | Chang | ...................... | G01J 3/12 |
| 2018/0204890 A1 | 7/2018 | Akimoto | | |
| 2019/0019850 A1* | 1/2019 | Xu | ......................... | G06V 40/12 |
| 2019/0197290 A1 | 6/2019 | Chen et al. | | |

OTHER PUBLICATIONS

Office Action dated Nov. 7, 2023, in corresponding Japanese Patent Application No. 2019-181626; 5 pages.

\* cited by examiner

OPTICAL SENSOR AND DISPLAY DEVICE

CROSS-REFERENCE TO RELATED APPLICATIONS

This application is a Continuation of International Patent Application No. PCT/JP2020/035042, filed on Sep. 16, 2020, which claims priority to Japanese Patent Application No. 2019-181626, filed on Oct. 1, 2019, the disclosures of which are incorporated herein by reference for all purposes as if fully set forth herein.

BACKGROUND OF THE INVENTION

1. Field of the Invention

An embodiment of the present invention relates to an optical sensor that can control the wavelength of incident light on a photoelectric conversion element. An embodiment of the present invention relates to an optical sensor including, for example, a Fabry-Perot interferometer and a photoelectric conversion element. An embodiment of the present invention relates to a display device including this type of optical sensor.

2. Description of Related Art

As a display device with an optical sensor that can scan an image or the like, Japanese Unexamined Patent Publication No. 2009-294315 discloses a liquid crystal display device including an array substrate provided with a plurality of switching elements and a plurality of optical sensors, a counter substrate, a liquid crystal layer, and an alignment control unit, wherein the alignment control unit is provided on at least one of the array substrate and the counter substrate, and the plurality of optical sensors overlap on the alignment control unit.

The optical sensor is applicable to various applications, but the appropriate wavelength differs depending on the object to be sensed. For example, when the optical sensor is utilized for fingerprint authentication, a visible light band (for example, 550 nm) is utilized, and when it is utilized for vein authentication, a near infrared light band (for example, 900 nm) is utilized.

SUMMARY OF THE INVENTION

An optical sensor in an embodiment according to the present invention includes at least one interferometer having a pair of semi-transparent mirrors spaced apart and oppositely arranged, and at least one position of the pair of semi-transparent mirrors can be displaced, at least one collimating element overlapping the at least one interferometer, and at least one photoelectric conversion element having sensitivity in the visible and near infrared light bands and receiving light passing through the interferometer and the collimating element.

A display device in an embodiment according to the present invention includes an optical sensor, and a display panel overlapping the optical sensor. The optical sensor including at least one interferometer having a pair of semi-transparent mirrors spaced apart and oppositely arranged, and at least one position of the pair of semi-transparent mirrors can be displaced, at least one collimating element overlapping the at least one interferometer, and at least one photoelectric conversion element having sensitivity in the visible and near light infrared bands and receiving light passing through the interferometer and the collimating element. The display panel is located on the side of the at least one interferometer of the optical sensor.

DESCRIPTION OF THE EMBODIMENTS

Figure 1A:
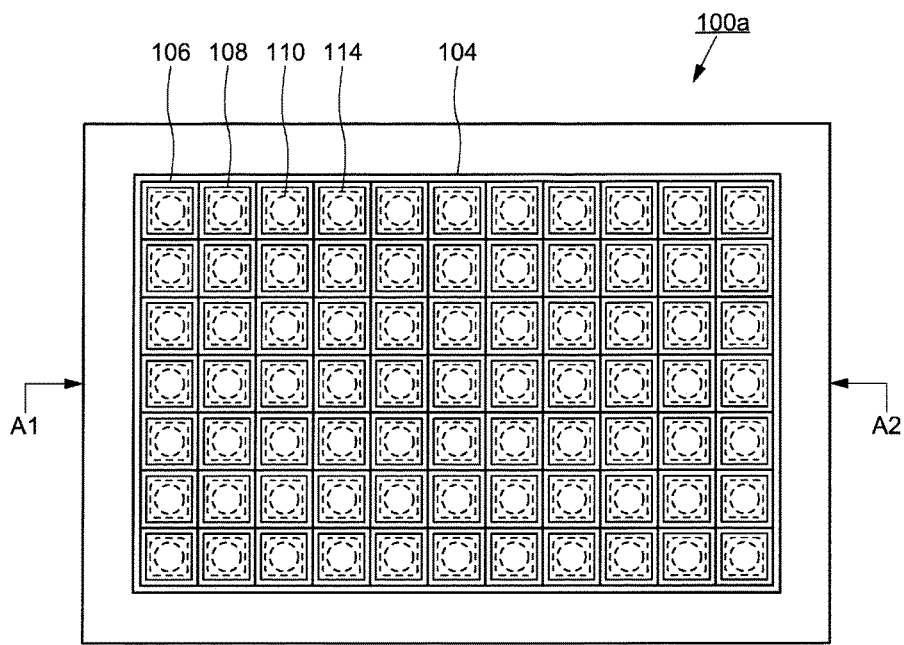
FIG. 1A shows a schematic plan view of an optical sensor according to an embodiment of the present invention.

Hereinafter, embodiments of the present invention will be described with reference to the drawings and the like. The present invention may be carried out in various forms without departing from the gist thereof, and is not to be construed as being limited to any of the following embodiments. Although the drawings may schematically represent the width, thickness, shape, and the like of each part in comparison with the actual embodiment in order to clarify the description, they are merely examples and do not limit the interpretation of the present invention. In the present specification and each of the figures, elements similar to those described previously with respect to the figures already mentioned are designated by the same reference numerals (or numbers followed by a, b, etc.), and a detailed description thereof may be omitted as appropriate. Furthermore, the characters "first" and "second" appended to each element are convenient signs used to distinguish each element, and have no further meaning unless specifically described.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

First Embodiment

An optical sensor according to an embodiment of the present invention has a function of dispersing incident light in a visible light band to a near infrared light band and detecting the spectroscopic light. The optical sensor according to the present embodiment will be described below with reference to the drawings.

1. Optical Sensor

Figure 1B:
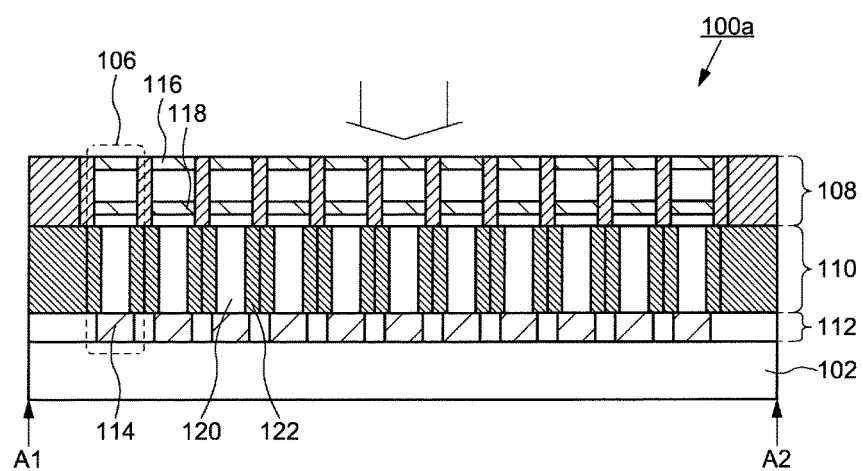
FIG. 1B is a schematic cross-sectional view of an optical sensor according to an embodiment of the present invention, and shows a cross-sectional structure corresponding to A1-A2 shown in FIG. 1A.

FIG. 1A shows a schematic plan view of the optical sensor 100a according to the present embodiment, and FIG. 1B shows a schematic cross-sectional view A1-A2 shown in the schematic plan view. As shown in FIG. 1A, the optical sensor 100a has a light receiving part 104. A plurality of pixels 106 are arranged in a first direction and a second direction intersecting the first direction in the light receiving part 104. The pixel 106 includes an interferometer 108, a collimating element 110, and a photoelectric conversion element 114.

As shown in FIG. 1B, the pixel 106 has a structure in which the interferometer 108, the collimating element 110, and a photo sensor 112 overlap from the light incident side. The photo sensor 112 is composed of a photoelectric conversion element 114 arranged corresponding to the pixel 106. The photoelectric conversion element 114 is arranged on a base plate 102. A glass substrate, a plastic substrate (including a flexible plastic film) or the like is used as the base plate 102. The optical sensor 100a has a structure in which light passing through the interferometer 108 and the collimating element 110 enters the photoelectric conversion element 114 composing the photo sensor 112.

The interferometer 108 has a structure in which a first semi-transparent mirror 116 and a second semi-transparent mirror 118 are oppositely arranged with a gap. In the interferometer 108, the position of at least one of the first semi-transparent mirror 116 and the second semi-transparent mirror 118 can be displaced, and has the function of spectrally dispersing the transmitted light by adjusting a gap between the pair of semi-transparent mirrors.

The collimating element 110 has a light guide path 120, and an absorption part 122 is arranged to surround the light guide path 120. The light guide path 120 is transparent to light in the visible light band to the near infrared light band, and an aperture of the light guide path 120 is preferably large enough to expose the light receiving surface of at least one photoelectric conversion element 114. The collimating element 110 has a function for adjusting the incident light beam into a parallel light beam by having a structure in which the light guide path 120 is surrounded by the absorption part 122. The collimating element 110 is preferably arranged so that the light guide path 120 corresponds to the photoelectric conversion element 114. The collimating element 110 makes it possible to make collimated light beams incident on the photoelectric conversion element 114, and it is possible to prevent light from being incident on the adjacent photoelectric conversion element (also called crosstalk). The collimating element 110 may be omitted, and in that case, the photo sensor 112 is arranged under the interferometer 108.

The photoelectric conversion element 114 converts light energy of incident light to electric energy, and has sensitivity to light in a visible light band to a near infrared light band.

The photoelectric conversion element 114 is, for example, a semiconductor element such as a photodiode or a phototransistor. The optical sensor 100a according to the present embodiment can image an object since the pixels 106 including the photoelectric conversion element 114 are arranged in the first direction and the second direction in the light receiving part 104. Since the light incident on the photoelectric conversion element 114 is the light spectrally dispersed by the interferometer 108, the optical sensor 100a can selectively receive light of a specific wavelength transmitted through the object, reflected from the object, or emitted by the object, and can acquire information about the object as two-dimensional data.

The optical sensor 100a is not limited to the configuration shown in FIG. 1A and FIG. 1B, and the photo sensor 112 may have a configuration in which the photoelectric conversion elements 114 are arrayed one-dimensionally. In this configuration, the photo sensor 112 can be regarded as a detection head in which the photoelectric conversion elements 114 are arrayed one-dimensionally, and two-dimensional data on an object can be acquired by scanning the detection head in one direction. Although not shown in FIG. 1A and FIG. 1B, the optical sensor 100a may be arranged with a driving circuit for driving the pixel 106 and a reading circuit for reading the output signal of the photo sensor 112 outside the light receiving part 104.

Figure 2A:
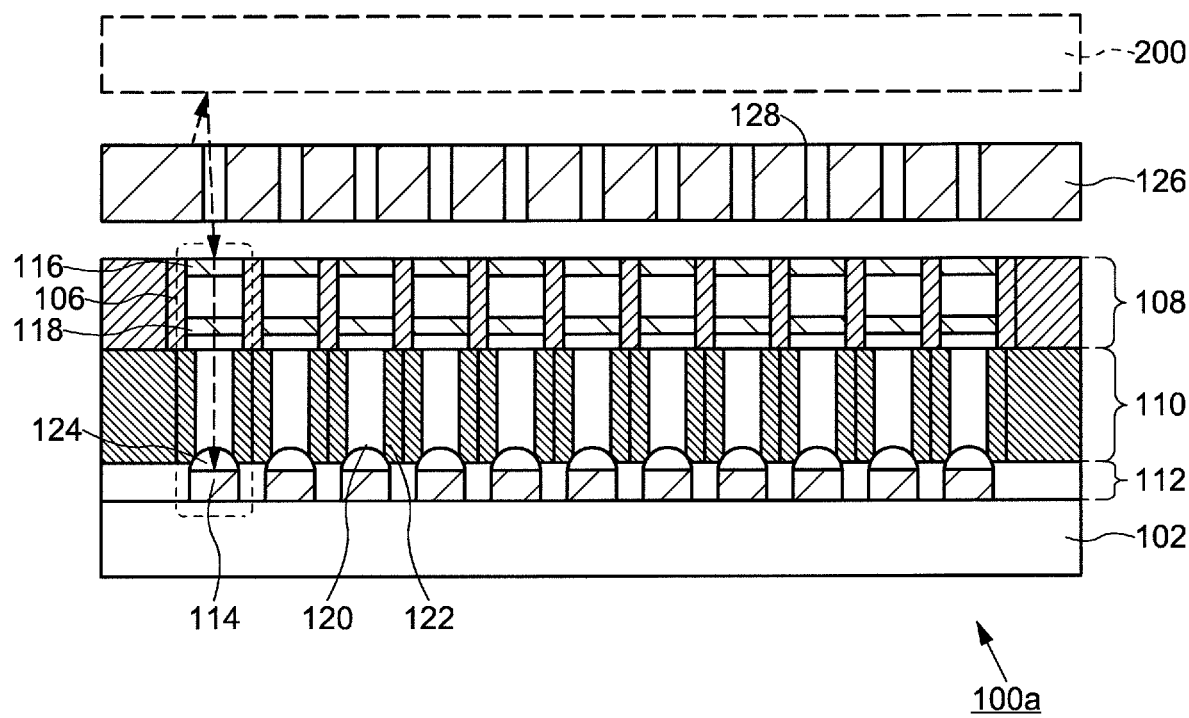
FIG. 2A shows a schematic cross-sectional view of an optical sensor according to an embodiment of the present invention.

The optical sensor 100a may further include a lighting unit 126 on the light incident side of the interferometer 108, as shown in FIG. 2A. The lighting unit 126 is composed of a light emitting diode and a light guide plate, and the light guide plate may be provided with a through hole 128. The lighting unit 126 may be configured to illuminate the object 200 and cause reflected light to enter the interferometer 108 through the through hole 128. The optical sensor 100a shown in FIG. 2A allows the light reflected by the object 200 to be injected into the through holes 128 when the object 200 is irradiated with white light including near-infrared light from the lighting unit 126, so that the light spectrally dispersed by the interferometer 108 can be detected by the photoelectric conversion element 114. A plurality of kinds of information attributable to the optical characteristics of the object 200 can be obtained by spectroscopy of the reflected light by the interferometer 108.

The lighting unit 126 may be disposed on the opposite side of the object 200.

That is, the lighting unit 126 and the optical sensor 100a may be arranged across the object 200. According to this arrangement, the light emitted from the lighting unit 126 and transmitted through the object 200 enters the optical sensor 100a.

2. Pixel

Figure 3:
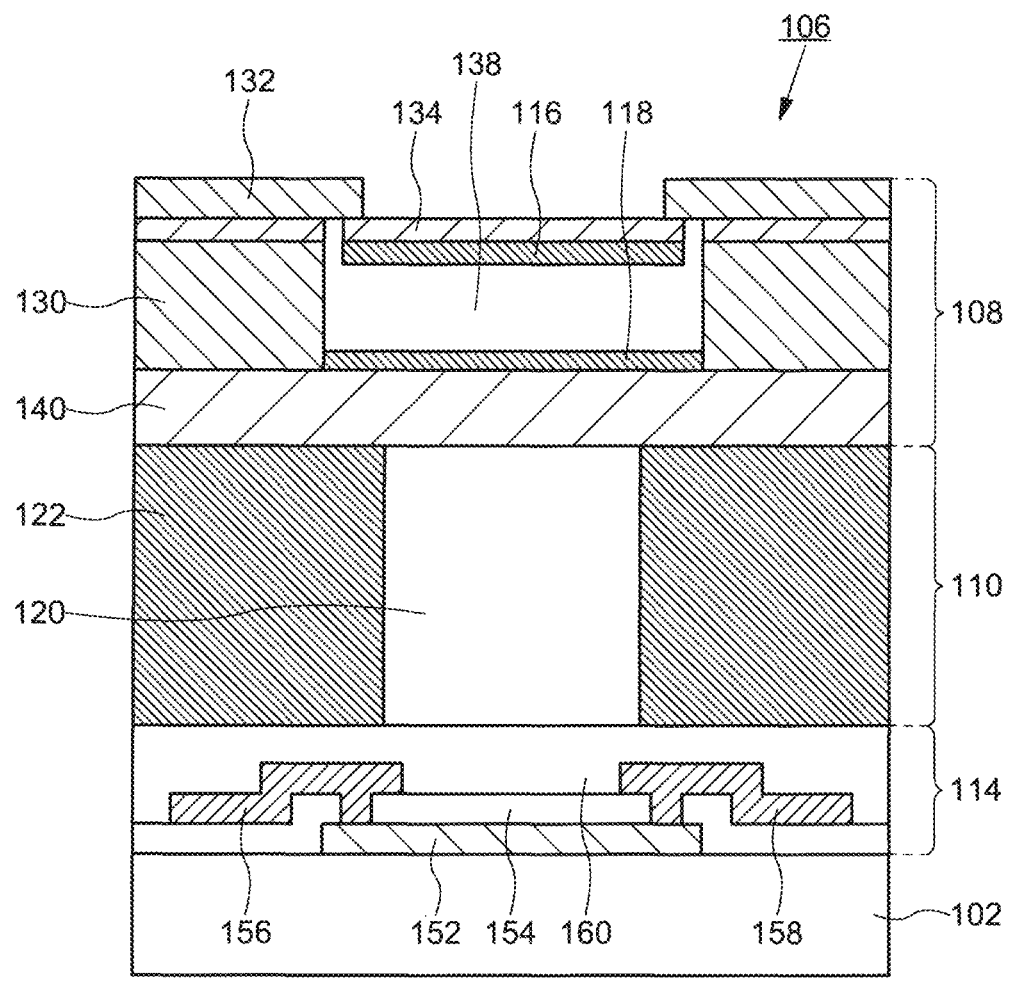
FIG. 3 shows a schematic cross-sectional view of a pixel in an optical sensor according to an embodiment of the present invention.

FIG. 3 shows a cross-sectional structure of the pixel 106. The pixel 106 has a structure in which the interferometer 108, the collimating element 110, and the photoelectric conversion element 114 overlap from the light incident side. The pixel 106 is configured to optically adjust the light spectrally dispersed by the interferometer 108 to parallel light by the collimating element 110 and enter the photoelectric conversion element 114. It is possible to obtain a two-dimensional image having a high resolution, since each pixel 106 of the optical sensor 100a has such a configuration.

The interferometer 108 includes the first semi-transparent mirror 116, a window 134 formed of an insulating material that transmits light in at least the visible and near-infrared bands, a beam 132 having elasticity and supporting the window 134, a pillar 130 supporting the beam 132, the second semi-transparent mirror 118, and a substrate 140 formed of an insulating material that transmits light in at least the visible and near-infrared bands. The pillar 130 supports the beam 132 and has a function as a spacer separating the first semi-transparent mirror 116 and the second semi-transparent mirror 118.

The first semi-transparent mirror 116 and the second semi-transparent mirror 118 are formed of a film having a high refractive index (high refractive index film). A semiconductor material such as silicon (Si) or germanium (Ge) is used as the high refractive index film. Also, the first semi-transparent mirror 116 and the second semi-transparent mirror 118 may be formed of a semi-transparent film made of a metal such as aluminum. The first semi-transparent mirror 116 and the second semi-transparent mirror 118 can be formed of a metal oxide material used for a transparent conductive film such as indium tin oxide (ITO) or indium zinc oxide (IZO). The beam 132 is bent to change the size of a gap 138 when an electrostatic force is applied between the first semi-transparent mirror 116 and the second semi-transparent mirror 118. The interferometer 108 has a function of displacing at least one position of the first semi-transparent mirror 116 and the second semi-transparent mirror 118 to change the size of the gap 138, thereby interfering with the incident light and emitting the light whose wavelength is changed from the side of the second semi-transparent mirror 118.

The light guide path 120 of the collimating element 110 is arranged to overlap the photoelectric conversion element 114. The absorption part 122 is arranged around the light guide path 120. Even when the photoelectric conversion elements 114 are arranged in a matrix, it is possible to prevent stray light from entering the adjacent photoelectric conversion elements by arranging the collimating elements 110. In other words, crosstalk between pixels can be prevented. The collimating element 110 has a function of adjusting the light output from the interferometer 108 so that it becomes a parallel light beam, and has a thickness of 10 μm to 200 μm, for example, about 100 μm.

The photoelectric conversion element 114 is irradiated with light passing through the collimating element 110. The photoelectric conversion element 114 has a function of converting light energy to electric energy by a photovoltaic effect when the light receiving surface is irradiated with light. The photovoltaic power generated in the photoelectric conversion element 114 is read out as an electric signal. The optical sensor 100a has pixels 106 arranged in a matrix in the light receiving part 104, and can obtain information based on the optical characteristics of an object as two-dimensional information (image information) by obtaining signals from each pixel.

3. Photoelectric Conversion Element

The photoelectric conversion element 114 includes a photoelectric conversion layer 152, a first electrode 156, and a second electrode 158, as shown in FIG. 3. The photoelectric conversion layer 152 is arranged on the base plate 102. The photoelectric conversion layer 152 is formed of an inorganic semiconductor material or an organic semiconductor material that exhibits a photovoltaic effect on light in the visible and near-infrared bands. The photoelectric conversion layer 152 is connected to the first electrode 156 and the second electrode 158. One of the first electrode 156 and the second electrode 158 is a positive electrode and the other is a negative electrode. An insulating layer 154 may be disposed on the photoelectric conversion layer 152, and the first electrode 156 and the second electrode 158 may be connected to the photoelectric conversion layer 152 through contact holes formed in the insulating layer 154. Further, a planarizing layer 160 formed of an insulating material may be disposed on the upper layers of the first electrode 156 and the second electrode 158. Although the photoelectric conversion element 114 shown in FIG. 3 shows an example in which the electrode is a planar type, as another embodiment, the first electrode 156 and the second electrode 158 may be a sandwich type sandwiching the photoelectric conversion layer 152. The photoelectric conversion element 114 has a light receiving surface in a region inside the first electrode 156 and the second electrode 158.

For example, the photoelectric conversion element 114 is formed of crystalline silicon. It is possible to obtain the photoelectric effect by light in the visible to near-infrared light band by forming a photodiode with such a silicon semiconductor, since the band gap of single-crystal silicon is 1.1 eV and that of poly-crystalline silicon is roughly 1.2 to 1.4 eV. The photoelectric conversion element 114 may be formed of an organic semiconductor that is sensitive to light in the visible to near-infrared light bands. A π-conjugated polymer material can be used as the organic semiconductor. The photoelectric conversion element 114 can be made thinner by forming the photoelectric conversion layer 152 as a thin film. Although not shown, a photodiode formed on a semiconductor substrate may be used as the photoelectric conversion element 114.

4. Collimating Element

Figure 4A:
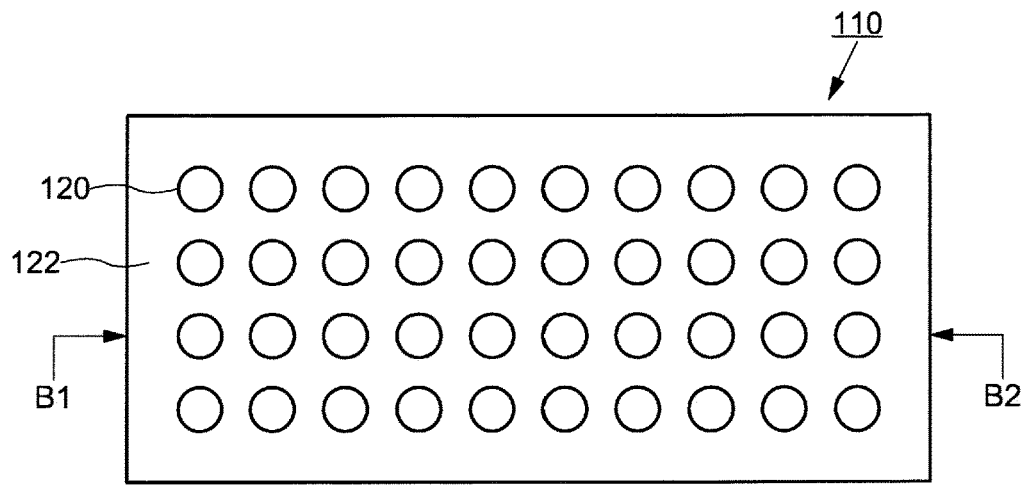
FIG. 4A shows a schematic plan view of a collimating element utilized in an optical sensor according to an embodiment of the present invention.

FIG. 4A shows a plan view of the collimating element 110. The collimating element 110 shown in FIG. 4A is an example, and has a structure in which the light guide path 120 is arranged in the absorption part 122. The light guide path 120 has a configuration arranged in a first direction and a second direction intersecting the first direction. The light guide path 120 is formed of a member which transmits light in the visible and near infrared light bands, and the absorption part 122 is formed of a member which absorbs light. The structures of the light guide path 120 and the absorption part 122 can vary and an example thereof will be described with reference to FIG. 4B and FIG. 4C.

Figure 4B:
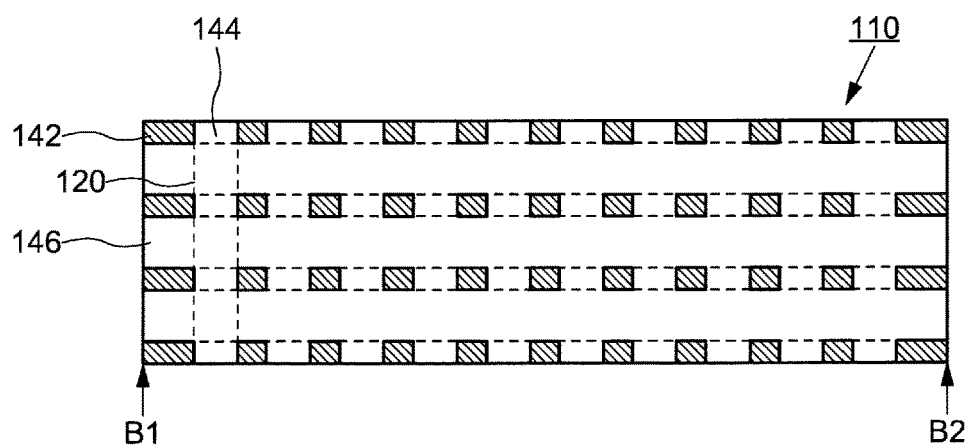
FIG. 4B is a schematic cross-sectional view of a collimating element of the present invention, and shows an example of a cross-sectional structure corresponding to B1-B2 shown in FIG. 2A.

FIG. 4B shows an example of a cross-sectional structure of the collimating element 110 corresponding to B1-B2 shown in a plan view. The collimating element 110 shown in FIG. 4B has a structure in which a plurality of light shielding layers 142 are arranged across a transparent resin layer 146. The light shielding layer 142 is formed of a through hole 144, and a light guide path 120 is formed by arranging the through hole 144 to overlap. The collimating element 110 shown in FIG. 4B can be simply manufactured by alternately laminating the light shielding layer 142 and the transparent resin layer 146. A resin material containing titanium black, carbon black or the like as a black pigment is used for the light shielding layer 142, and an acrylic resin, an epoxy resin or the like can be used for the transparent resin layer 146. The collimating element 110 shown in FIG. 4B has absorption parts 122 formed by overlapping light shielding layers 142, and light guide paths 120 formed by overlapping regions of through holes 144.

Figure 4C:
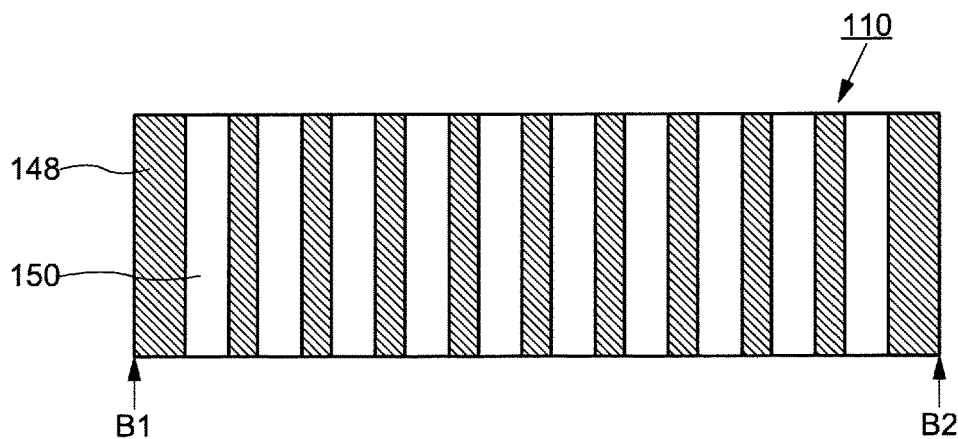
FIG. 4C is a schematic cross-sectional view of a collimating element utilized in an optical sensor according to an embodiment of the present invention, and shows another example of a cross-sectional structure corresponding to B1-B2 shown in FIG. 2A.

The collimating element 110 shown in FIG. 4C is arranged with a light guide pillar 150 to pass through the light shielding layer 148. The light shielding layer 148 is arranged to surround the light guide pillar 150 along the longitudinal direction thereof. A resin material containing titanium black, carbon black or the like as a black pigment is used as the light shielding layer 148. The light shielding layer 148 may be formed of an organic material or an inorganic material, and the surface of the light shielding layer may be blackened to suppress reflection, for example, by black plating. The light guide pillar 150 is formed of a rod made of a transparent resin material, glass or plastic. In the collimating element 110 shown in FIG. 4C, the light guide pillar 150 corresponds to the light guide path 120, and the light shielding layer 148 corresponds to the absorption part 122. The optical sensor 100a according to the present embodiment may have both the configurations shown in FIG. 4B and FIG. 4C.

5. Interferometer

Figure 5A:
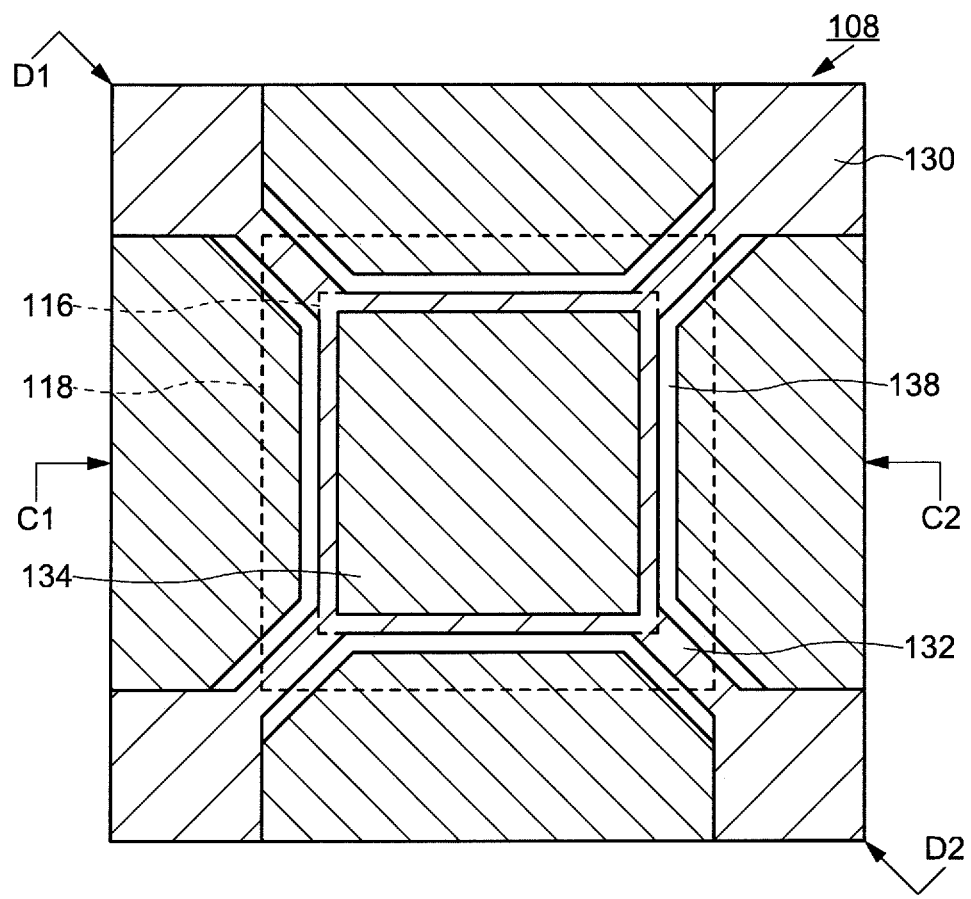
FIG. 5A shows a schematic plan view of an interferometer utilized in an optical sensor according to an embodiment of the present invention.
Figure 5B:
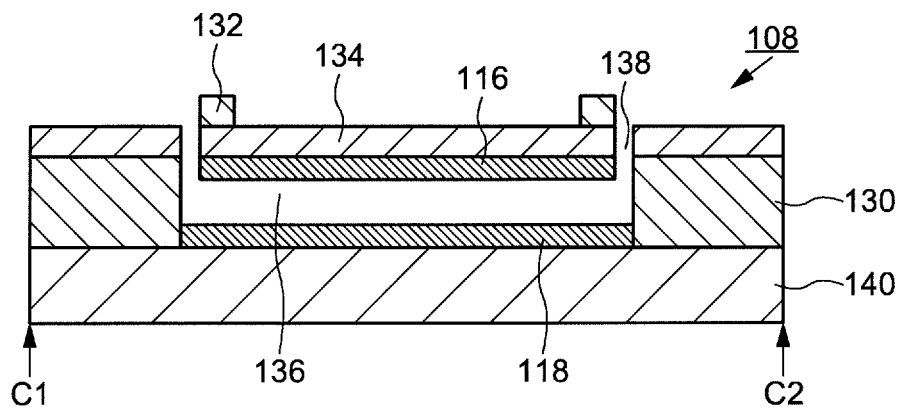
FIG. 5B is a schematic cross-sectional view of an interferometer utilized in an optical sensor according to an embodiment of the present invention, and shows a cross-sectional structure corresponding to C1-C2 shown in FIG. 5A.
Figure 5C:
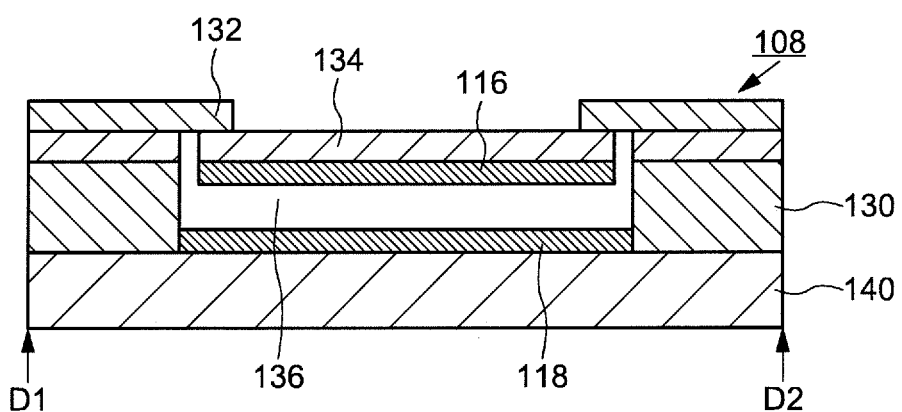
FIG. 5C is a schematic cross-sectional view of an interferometer utilized in an optical sensor according to an embodiment of the present invention, and shows a cross-sectional structure corresponding to D1-D2 shown in FIG. 5A.

FIG. 5A, FIG. 5B, and FIG. 5C show a structure of interferometer 108. FIG. 5A shows a plan view of interferometer 108, FIG. 5B shows a cross sectional view corresponding to C1-C2 shown in a plan view, and FIG. 5C shows a cross sectional view corresponding to D1-D2 shown in a plan view.

The interferometer 108 has a fine structure including a movable part and a gap. As shown in FIG. 5A, the interferometer 108 includes the pillar 130 arranged at four corners, a window 134 arranged surrounded by the pillar 130, and the beam 132 arranged to bridge between the pillar 130 and the window 134. The window 134 is connected to the beam 132 at four locations, thereby maintaining a horizontal state and maintaining a stable state. The periphery of the window 134 is separated from the pillar 130 by providing the gap 138 except for the portion of the beam 132. The first semi-transparent mirror 116 and the second semi-transparent mirror 118 are arranged to have overlapping portions in a plan view. For example, it is possible to ensure that interfere the incident light is interfered with and perform spectroscopy by arranging the first semi-transparent mirror 116 arranged on the light incident side so that the area of the second semi-transparent mirror 118 arranged on the light emitting side is increased with respect to the first semi-transparent mirror 116 arranged on the light incident side.

As shown in FIG. 5B, the first semi-transparent mirror 116 is arranged on the side of the window 134, and the second semi-transparent mirror 118 is arranged on the side of the substrate 140. The gap 136 is formed between the first semi-transparent mirror 116 and the second semi-transparent mirror 118. The gap between the first semi-transparent mirror 116 and the second semi-transparent mirror 118 is set by the height of the pillar 130. The gap 138 is formed between the window 134 and the pillar 130. The window 134 can be displaced vertically without interference (without sliding) with the pillar 130 by the gap 138.

As shown in FIG. 5C, since both ends of the window 134 are supported by the beam 132 (four portions), the window 134 is maintained in a substantially horizontal state to prevent twisting and tilting, and the first semi-transparent mirror 116b and the second semi-transparent mirror 118 are maintained in parallel. The window 134 is a movable part and is displaced vertically in the cross-sectional view of FIG. 5C. The first semi-transparent mirror 116 is arranged in the window 134, and the second semi-transparent mirror 118 is arranged on the substrate 140. The gap between the first semi-transparent mirror 116 and the second semi-transparent mirror 118 is set to be approximately the same range as the wavelength band of the light to be spectrally dispersed, and is arranged to have a gap of, for example, 1000 nm to 1500 nm.

The interferometer 108 has a function of causing interference of light between the first semi-transparent mirror 116 and the second semi-transparent mirror 118 and outputting light of a specific wavelength as transmitted light. These interferometers are also referred to as Fabry-Perot interferometers. Thus, the interferometer 108 may also be referred to as a Fabry-Perot interferometer.

The interferometer 108 can change the wavelength of transmitted light by adjusting the gap between the first semi-transparent mirror 116 and the second semi-transparent mirror 118. It is possible to change the gap between the two semi-transparent mirrors and select the wavelength of the interfering light by applying an electrostatic force between the first semi-transparent mirror 116 and the second semi-transparent mirror 118. In other words, the wavelength of the transmitted light can be changed by the potential difference between the first semi-transparent mirror 116 and the second semi-transparent mirror 118. The interferometer 108 having such a structure and function can be manufactured by microelectromechanical system (MEMS) technology. The interferometer 108 includes a micro-mechanical element, such as the semi-transmissive mirror, formed by a MEMS structure in which the micro-mechanical element operates by electrical action.

Figure 6A:
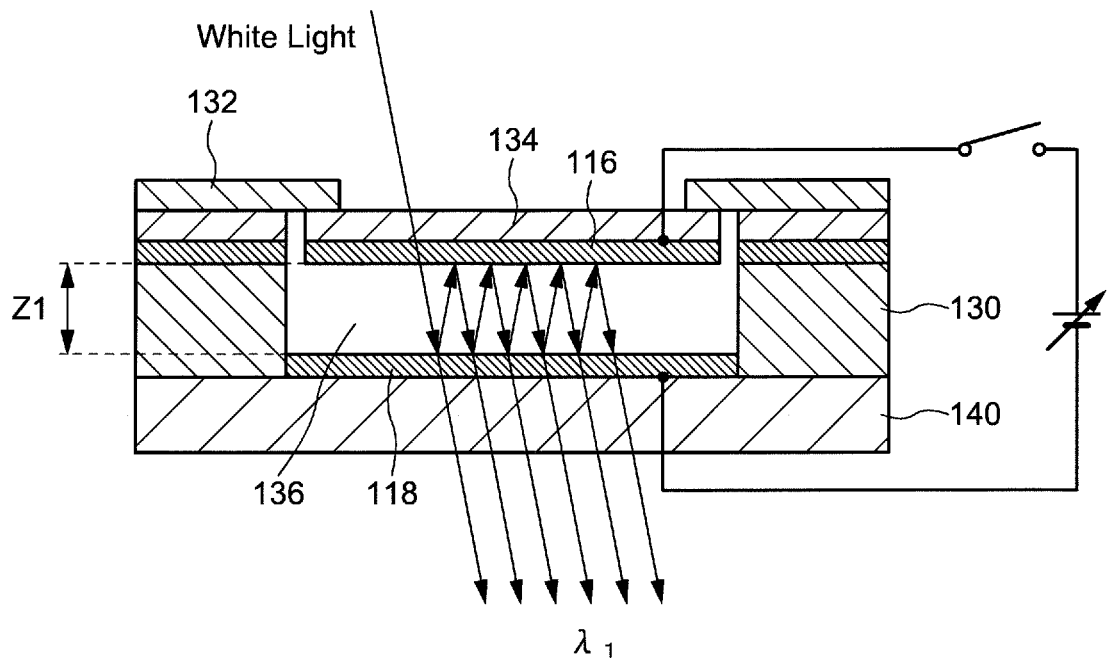
FIG. 6A is a diagram for explaining the operation of an interferometer utilized in an optical sensor according to an embodiment of the present invention, and shows a state in which a gap between two semi-transparent mirrors is Z1.

FIG. 6A shows a state of not applying a voltage between the first semi-transparent mirror 116 and the second semi-transparent mirror 118. That is, the gap between the first semi-transparent mirror 116 and the second semi-transparent mirror 118 is Z1, indicating the initial state. In this state, the incident light interferes between the first semi-transparent mirror 116 and the second semi-transparent mirror 118 when white light enters from the side of the first semi-transparent mirror 116, and the light of the wavelength λ1 intensified by the interference is emitted from the second semi-transparent mirror 118 as transmitted light.

Figure 6B:
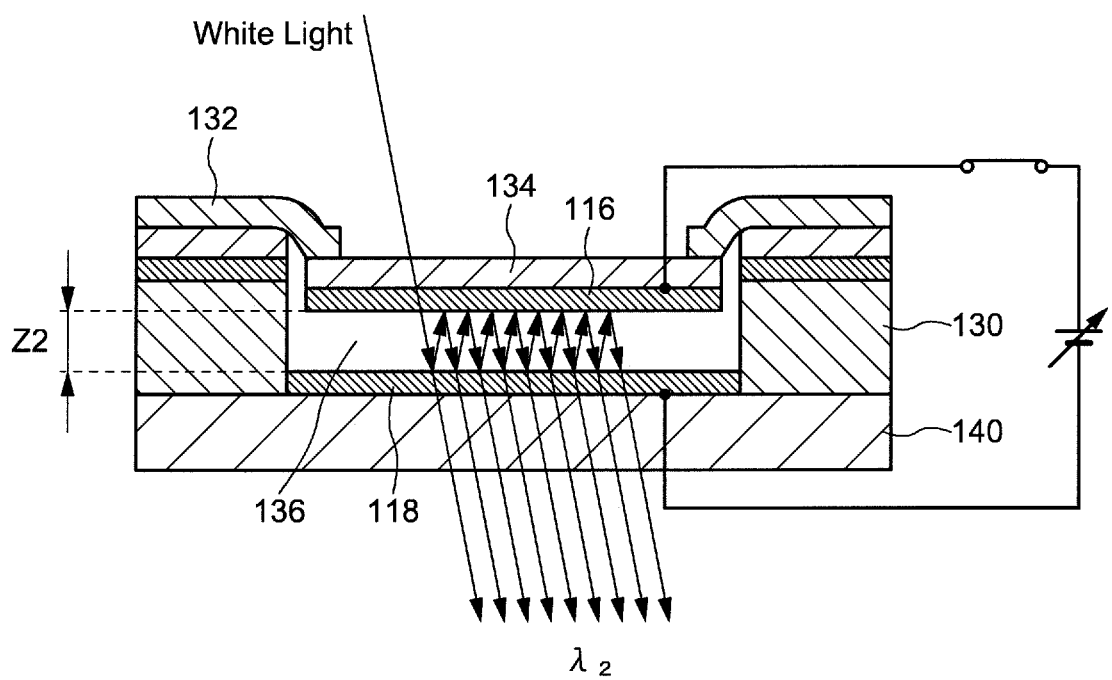
FIG. 6B is a diagram for explaining an operation of an interferometer utilized in an optical sensor according to an embodiment of the present invention, and shows a state in which a gap between a set of semi-transparent mirrors is Z2 (<Z1)

FIG. 6B shows a state of applying a predetermined voltage between the first semi-transparent mirror 116 and the second semi-transparent mirror 118. The electrostatic force works by the applied voltage, and the gap between the first semi-transparent mirror 116 and the second semi-transparent mirror 118 changes to Z2.

It is assumed that when applied with the voltage, the gap Z2 is smaller than the gap Z1 in the initial state (Z2<Z1). In this case, the wavelength $\lambda_2$ of the light emitted from the side of the second semi-transparent mirror 118 is shorter than the wavelength $\lambda_1$ of the initial state, and light having a shorter wavelength is emitted from the interferometer 108. In this way, the interferometer 108 has a function of dispersing the incident light, and the wavelength of the spectroscopic light can be changed by electrically controlling the gap between the two semi-transmissive mirrors.

6. Method for Fabricating Interferometer

Referring to FIG. 7A, FIG. 7B, FIG. 7C, and FIG. 7D, and FIG. 8A, FIG. 8B, FIG. 8C, and FIG. 8D, a method of manufacturing the interferometer 108 will be described. As shown below, the interferometer 108 is manufactured by MEMS technology.

Figure 7A:
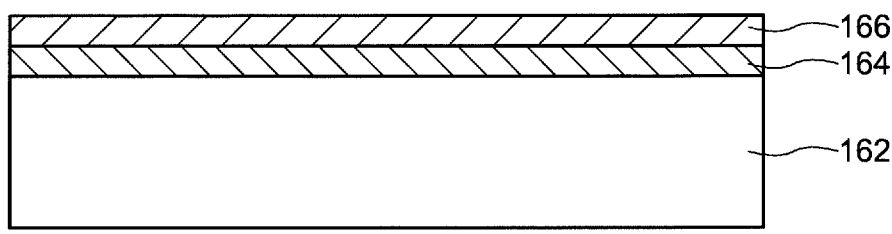
FIG. 7A shows an example of a method of manufacturing an interferometer utilized in an optical sensor according to an embodiment of the present invention.

FIG. 7A shows a step of forming a semiconductor film 164 and an insulating film 166 on a substrate 162. A glass substrate is utilized as the substrate 162, for example. A polycrystalline silicon film or an amorphous silicon film is utilized as the semiconductor film 164. The polycrystalline silicon and the amorphous silicon are prepared by a low-pressure CVD method (vapor phase growth method) or a plasma CVD method. A thickness of the semiconductor film 164 is 1 µm to 10 µm, for example, 4 µm. The insulating film 166 is formed on the semiconductor film 164. For example, a silicon oxide film is utilized as the insulating film 166. A thickness of the silicon oxide film is 1 µm to 5 µm, for example, 2 µm by a low-pressure CVD method or a plasma CVD method.

Figure 7B:
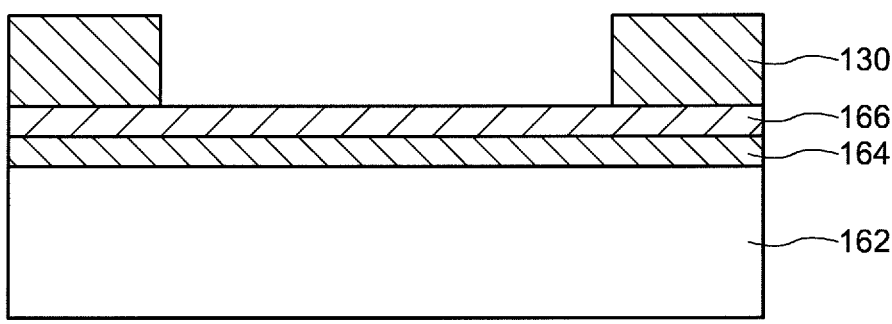
FIG. 7B shows an example of a method of manufacturing an interferometer utilized in an optical sensor according to an embodiment of the present invention.

FIG. 7B shows a step of forming the pillars 130. The pillars 130 are formed of a semiconductor film. As described above, a polycrystalline silicon film or an amorphous silicon film is utilized as the semiconductor film. At first, a semiconductor film is formed on top of the insulating film 166 with a thickness of µm to 1.5 µm, then, a mask is formed by photolithography, and the semiconductor film in the part that serves as the window is removed by etching to form the pillar 130.

Figure 7C:
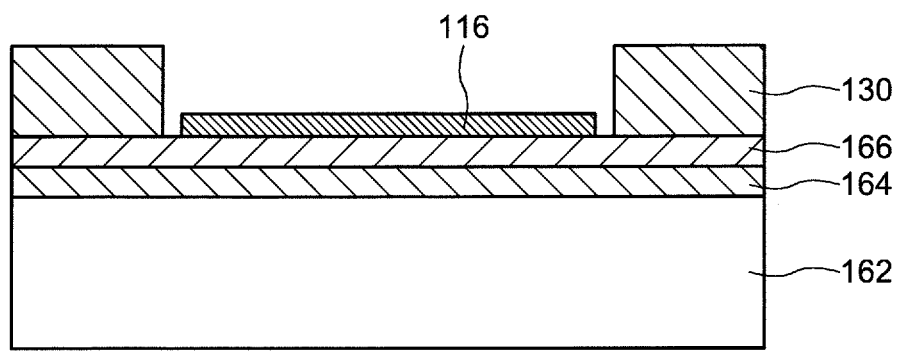
FIG. 7C shows an example of a method of manufacturing an interferometer utilized in an optical sensor according to an embodiment of the present invention.

FIG. 7C shows a step of forming the first semi-transparent mirror 116. The first semi-transparent mirror 116 is formed on the surface of the insulating film 166 exposed between the pillars 130. The first semi-transparent mirror 116 is formed of a high refractive index film such as silicon (Si) or germanium (Ge). The first semi-transparent mirror 116 is formed of a semi-transparent film made of a metal such as aluminum or a transparent conductive film such as ITO.

Figure 7D:
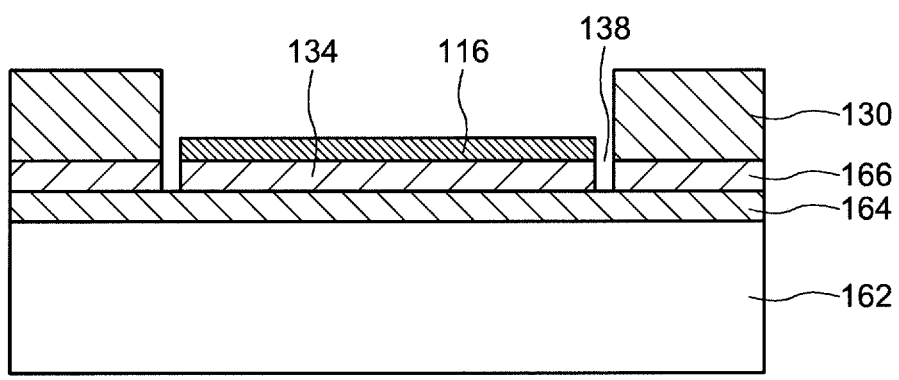
FIG. 7D shows an example of a method of manufacturing an interferometer utilized in an optical sensor according to an embodiment of the present invention.

FIG. 7D shows a step of processing the insulating film 166 that forms the window 134. Since the window 134 becomes a free member from the pillar 130, as shown in the figure, the insulating film 166 between the first semi-transparent mirror 116 and the pillar 130 are removed by etching to form the gap 138.

Figure 8A:
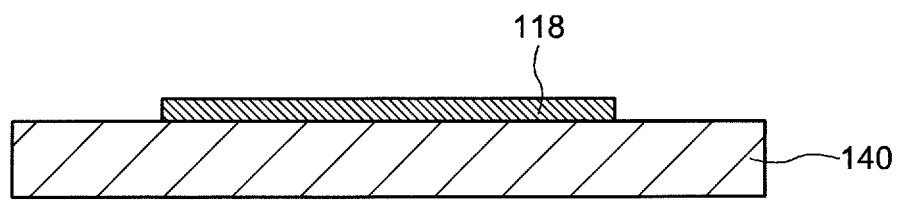
FIG. 8A shows an example of a method of manufacturing an interferometer utilized in an optical sensor according to an embodiment of the present invention.

FIG. 8A shows a step of forming a second semi-transparent mirror 118 on the substrate 140. A glass substrate, a plastic substrate (or a flexible plastic film) is used as the substrate 140. The second semi-transparent mirror 118 is formed of a high refractive index film such as silicon (Si) or germanium (Ge), a semi-transparent film such as aluminum, or a transparent conductive film such as ITO.

Figure 8B:
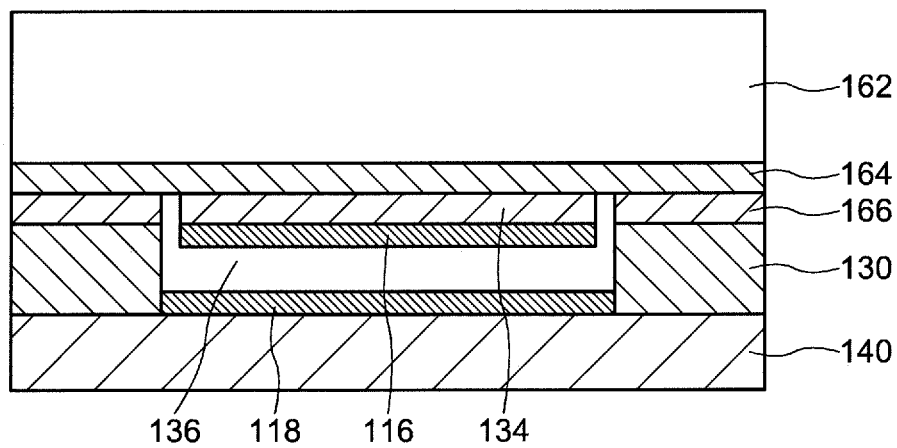
FIG. 8B shows an example of a method of manufacturing an interferometer utilized in an optical sensor according to an embodiment of the present invention.

FIG. 8B shows a step of integrating the substrate 140 and the structure including the semiconductor film 164, the window 134, the first semi-transparent mirror 116, and the pillars 130 fabricated in the steps up to FIG. 7D. Specifically, the pillars 130 and the substrate 140 are brought into contact with each other and bonded by direct bonding or anodic bonding. The pillars 130 and the substrate 140 may be bonded together using an adhesive.

Figure 8C:
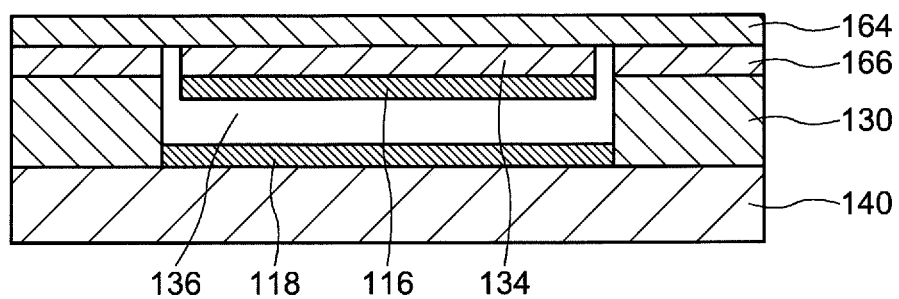
FIG. 8C shows an example of a method of manufacturing an interferometer utilized in an optical sensor according to an embodiment of the present invention.

FIG. 8C shows a step of removing the substrate 162 to expose the semiconductor film 164. Since the substrate 162 is a glass substrate, it can be removed by etching using hydrofluoric acid or the like. The substrate 162 may be thinned by chemical mechanical polishing (CMP) and then removed by chemical etching using hydrofluoric acid or the like to expose the surface of the semiconductor film 164.

Figure 8D:
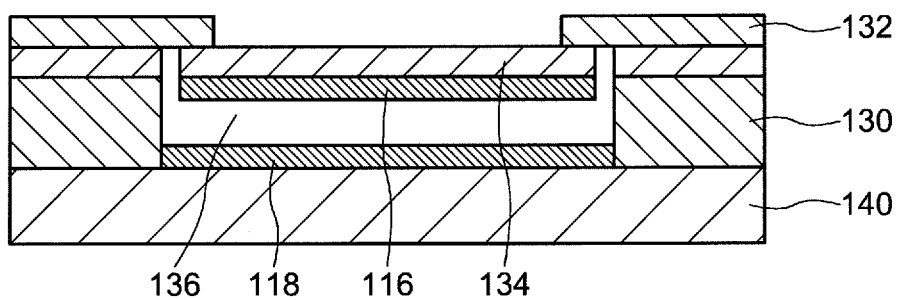
FIG. 8D shows an example of a method of manufacturing an interferometer utilized in an optical sensor according to an embodiment of the present invention.

FIG. 8D shows the step of forming the beam 132. The beam 132 is formed of a semiconductor film 164. The semiconductor film 164 is etched so that the window 134 is connected to the beam 132 and the beam 132 is supported by the pillars 130.

As described above, the interferometer 108 shown in FIG. 5A, FIG. 5B, and FIG. 5C is fabricated. The interferometer 108 according to the present embodiment can be fabricated by using a thin film deposition technique and a processing technique used for fabricating a semiconductor device or a display panel, and has an advantage that it is not necessary to introduce much new equipment. The methods of fabricating the interferometer 108 are shown in FIG. 7A, FIG. 7B, FIG. 7C, and FIG. 7D, and FIG. 8A, FIG. 8B, FIG. 8C, and FIG. 8D are examples.

7. Circuit and Drive Method for Optical Sensor

Figure 9A:
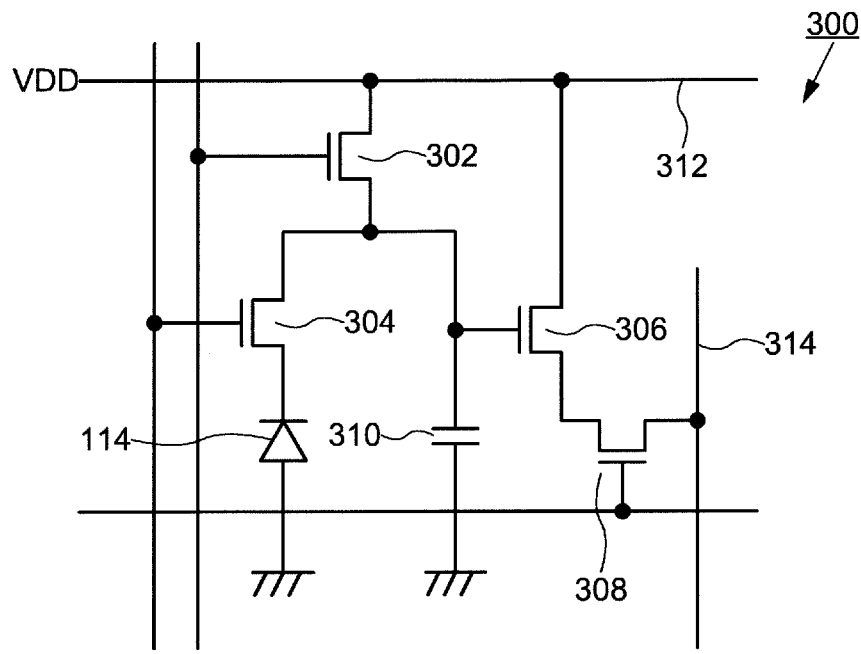
FIG. 9A shows an example of a pixel circuit in an optical sensor according to an embodiment of the present invention.

FIG. 9A shows an example of a pixel circuit of the photo sensor 112. The read circuit 300 includes a first transistor 302 connected to a power supply line (VDD) 312, a second transistor 304 connected between the first transistor 302 and the photoelectric conversion element 114, a first capacitor 310 connected in parallel between the first transistor 302 and the second transistor 304, a third transistor 306 in which a voltage applied in the first capacitor 310 is applied to a gate and connected to the power supply line 312, and a fourth transistor 308 connected between the third transistor 306 and a data output line 314. The read circuit outputs a current corresponding to the quantity of light received by the photoelectric conversion element 114 from the third transistor 306 to the data output line 314. The first to fourth transistors are formed on the base plate 102 by thin film transistors.

Figure 9B:
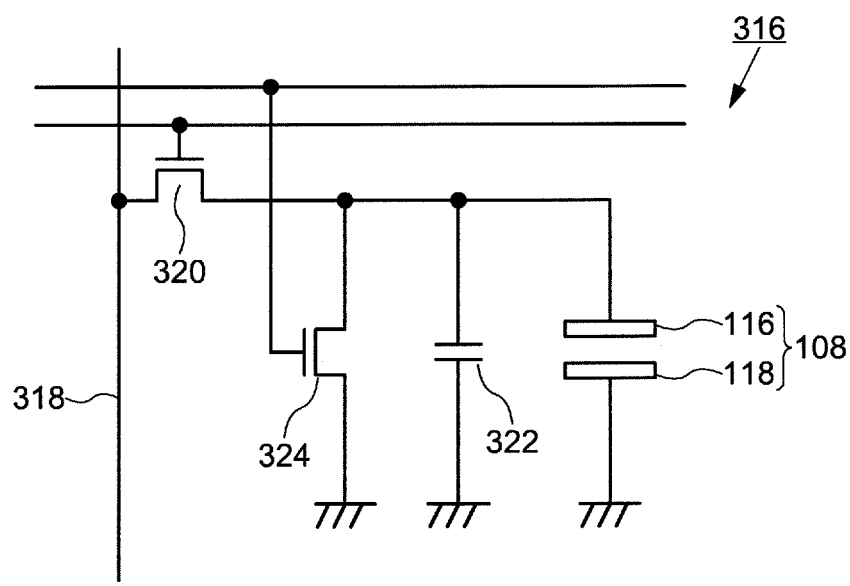
FIG. 9B shows an example of a control circuit of an interferometer in an optical sensor according to an embodiment of the present invention.

FIG. 9B shows an example of a control circuit of the interferometer 108. The control circuit 316 includes a fifth transistor 320 connected to a control signal line 318, a second capacitor 322 connected to the output terminal of the fifth transistor 320, and a sixth transistor 324 for resetting the voltage of the second capacitor 322. The first semi-transparent mirror 116 is connected to the fifth transistor 320, and the second semi-transparent mirror 118 is held at a ground potential, in the interferometer 108. The voltage applied to the first semi-transparent mirror 116 is held by the second capacitor 322. The voltage applied to the first semi-transparent mirror 116 is held for a certain period of time. When the fifth transistor 320 is turned off and the sixth transistor 324 is turned on, the second capacitor 322 is discharged and reset to the initial state. Thus, the voltage applied to the first semi-transparent mirror 116 also changes to the ground voltage.

The reading circuit 300 shown in FIG. 9A and the control circuit 316 shown in FIG. 9B are examples, and the circuit configuration of the optical sensor 100a according to the present embodiment is not limited thereto. As for the circuit for driving the optical sensor 100a, as long as the circuit has the same function, a circuit having another configuration may be applied.

Figure 10:
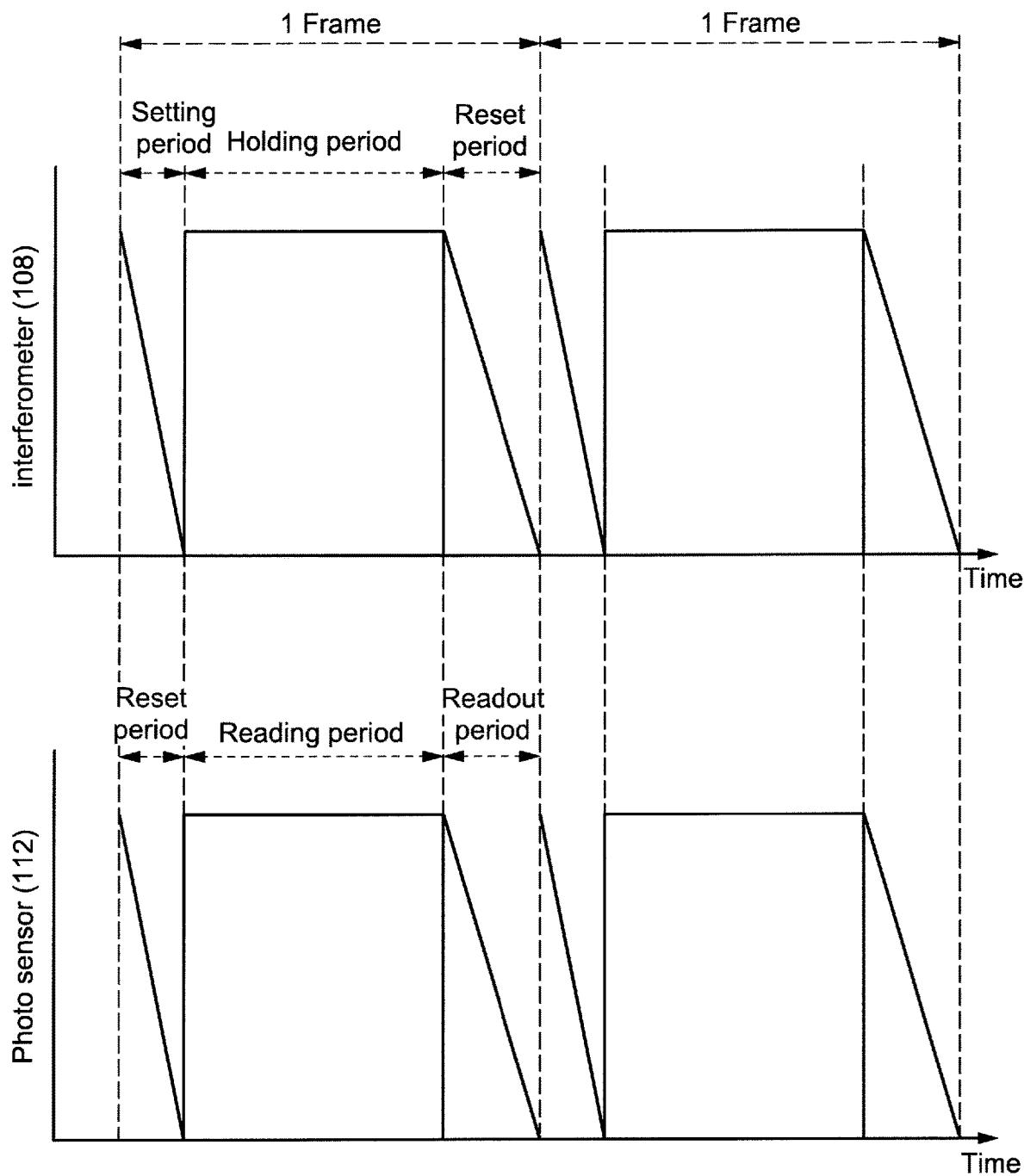
FIG. 10 shows an example of a method of driving an optical sensor according to an embodiment of the present invention.

FIG. 10 shows an example of a driving method of the optical sensor 100a. The optical sensor 100a operates in conjunction with the interferometer 108 and the photo sensor 112. Hereinafter, the pixel 106 of the optical sensor 100a will be described as having the circuits shown in FIG. 9A and FIG. 9B.

The optical sensor 100a receives one image data in one frame. As shown in FIG. 10, the photo sensor 112 includes a reset period, a reading period, and a readout period in one frame. In the reset period, the first transistor 302 is turned on, the second transistor 304 and the fourth transistor 308 are turned off, and the first capacitor 310 is charged to the power supply voltage (VDD) and initialized. In the reading period, the first transistor 302 is turned off, the second transistor 304 is turned on, and the fourth transistor 308 is turned off, and the photoelectric conversion element 114 is irradiated with light. Thus, the first capacitor 310 is charged to a voltage corresponding to the photovoltaic power of the photoelectric conversion element 114. In the readout period, the first transistor 302 and the second transistor 304 are turned off, the fourth transistor 308 is turned on, and a current corresponding to the gate voltage of the third transistor 306 flows from the power supply line 312 to the data output line 314. As for the gate voltage of the third transistor 306, a charging voltage is applied to the first capacitor 310. With this operation, a signal corresponding to the photovoltaic power of the photoelectric conversion element 114 can be read from the data output line 314.

The interferometer 108 includes a setting period, a holding period, and a reset period in one frame. The setting period corresponds to the reset period of the photo sensor 112, the holding period corresponds to the reading period, and the reset period corresponds to the readout period, in the interferometer 108, respectively. In the setting period, the fifth transistor 320 is turned on and the sixth transistor is turned off, and a voltage signal for controlling the gap between the two semi-transparent mirrors is input from the control signal line 318. The voltage signal input from the control signal line 318 is a charging voltage of the second capacitor 322. In the holding period, the fifth transistor 320 and the sixth transistor 324 are turned off, and the charged voltage of the second capacitor 322 is applied to the first semi-transparent mirror 116. The second semi-transparent mirror 118 is grounded, and an electrostatic force works on the two semi-transparent mirrors. That is, the displacement of the first semi-transparent mirror 116 is controlled by the charged voltage of the second capacitor 322. In the reset period, the fifth transistor 320 is turned off, the sixth transistor 324 is turned on, and the second capacitor 322 is discharged to return to the initial state. As a result, the first semi-transparent mirror 116 is set to the ground potential and returned to the initial state.

As shown in FIG. 10, it is possible to irradiate the photoelectric conversion element 114 with light of different wavelengths for each frame by operating the photo sensor 112 and the interferometer 108 in synchronization, and to obtain information corresponding to the exposure wavelength. It is possible to obtain a color image of an object by controlling the interference wavelength of the interferometer 108 for each frame and each pixel. The driving method shown in FIG. 10 is an example, and the optical sensor 100a according to the present embodiment is not limited to this driving method.

The optical sensor 100a according to the present embodiment can be used for biometric authentication, for example. Fingerprint authentication, vein authentication, and the like have been proposed as types of biometric authentication.

Biometric authentication is performed optically, but visible light (for example, light having a wavelength of 550 nm) is suitable for fingerprint authentication, and near-infrared light (for example, light having a wavelength of 900 nm) is suitable for vein authentication. In this case, in the conventional biometric sensor, to detect these plural wavelengths by one sensor, it is necessary to arrange a sensor for visible light detection and a sensor for near infrared light detection in the plane of the light receiving part, or arrange a visible light filter and a near infrared light filter. However, in such a conventional configuration, resolution is reduced which is a problem.

Figure 2B:
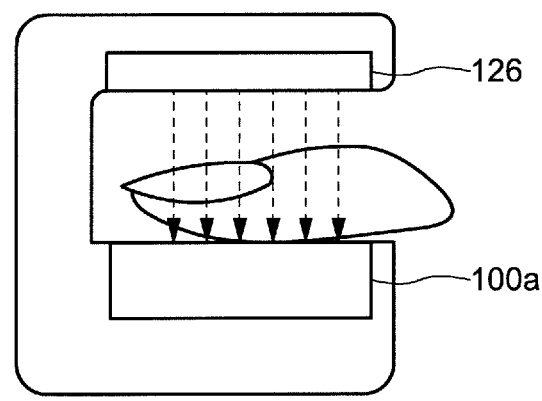
FIG. 2B shows a method of performing authentication using an optical sensor according to an embodiment of the present invention.

On the other hand, since the optical sensor 100a according to the present embodiment can control the light to be received by the photo sensor 112 by the interferometer 108, the image based on the light of different wavelengths can be obtained by the light receiving part 104 having the same resolution. For example, as shown in FIG. 2B, fingerprint authentication and vein authentication can be performed continuously just by putting a finger on the optical sensor 100a and irradiating the light of the lighting unit 126. In this case, as described above, the optical sensor 100a can perform fingerprint authentication and vein authentication substantially simultaneously without imposing a burden on the subject (or without being noticed by the subject) by changing the wavelength of the light received by the photo sensor 112 for each frame. Thus, the optical sensor 100a can be used as a biometric authentication device.

As described above, the optical sensor according to the present embodiment can select the wavelength of light detected by the optical sensor with the interferometer. It is possible to sense a plurality of information of an object without lowering resolution, by using an optical sensor having light sensitivity in a wide wavelength band.

Second Embodiment

This embodiment shows a configuration of the interferometer 108 different from that of the first embodiment. In the following description, parts different from the first embodiment will be mainly described.

Figure 11A:
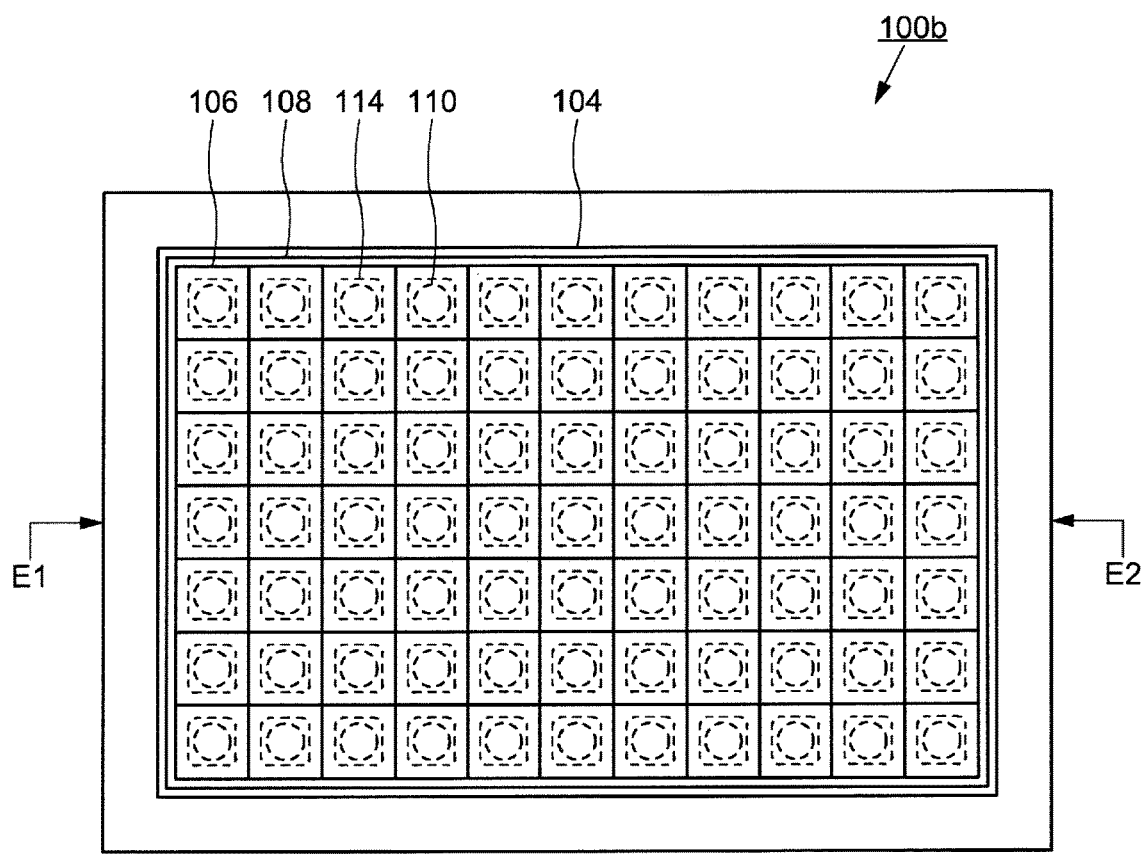
FIG. 11A shows a schematic plan view of an optical sensor according to an embodiment of the present invention.
Figure 11B:
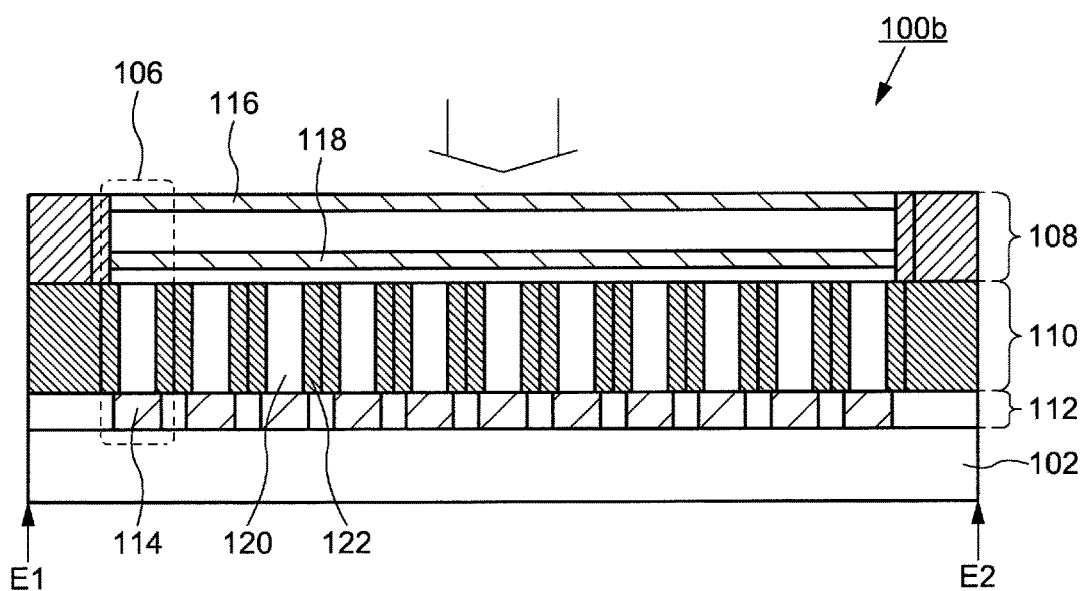
FIG. 11B is a schematic cross-sectional view of an optical sensor according to an embodiment of the present invention, and shows a cross-sectional structure corresponding to E1-E2 shown in FIG. 11A.

FIG. 11A shows a schematic plan view of an optical sensor 100b according to the present embodiment, and FIG. 11B shows a schematic cross-sectional view corresponding to E1-E2 shown in the schematic plan view. The optical sensor 100b has a configuration in which the photoelectric conversion element 114 is arranged for each pixel 106 and an interferometer 108 common to a plurality of pixels 106 is provided. The size of the interferometer is different from that of the first embodiment, and the structure of the interferometer 108 is the same.

The driving method of the photoelectric conversion element 114 and the interferometer 108 is the same as that of the first embodiment. The driving method can detect light of different wavelengths by changing the gap between the first semi-transparent mirror 116 and the second semi-transparent mirror 118 in the interferometer 108 for each frame, and can obtain a color image by superposing images of a plurality of frames.

According to the present embodiment, the structure of the optical sensor 100b can be simplified by commonly providing the interferometer 108 to the plurality of pixels 106. The configuration other than the interferometer 108 is the same as that of the first embodiment, and the same advantageous effects and effects can be obtained.

Third Embodiment

This embodiment shows an optical sensor in which the arrangement of the collimating elements is different from that of the second embodiment. In the following description, parts different from the second embodiment will be described.

Figure 12A:
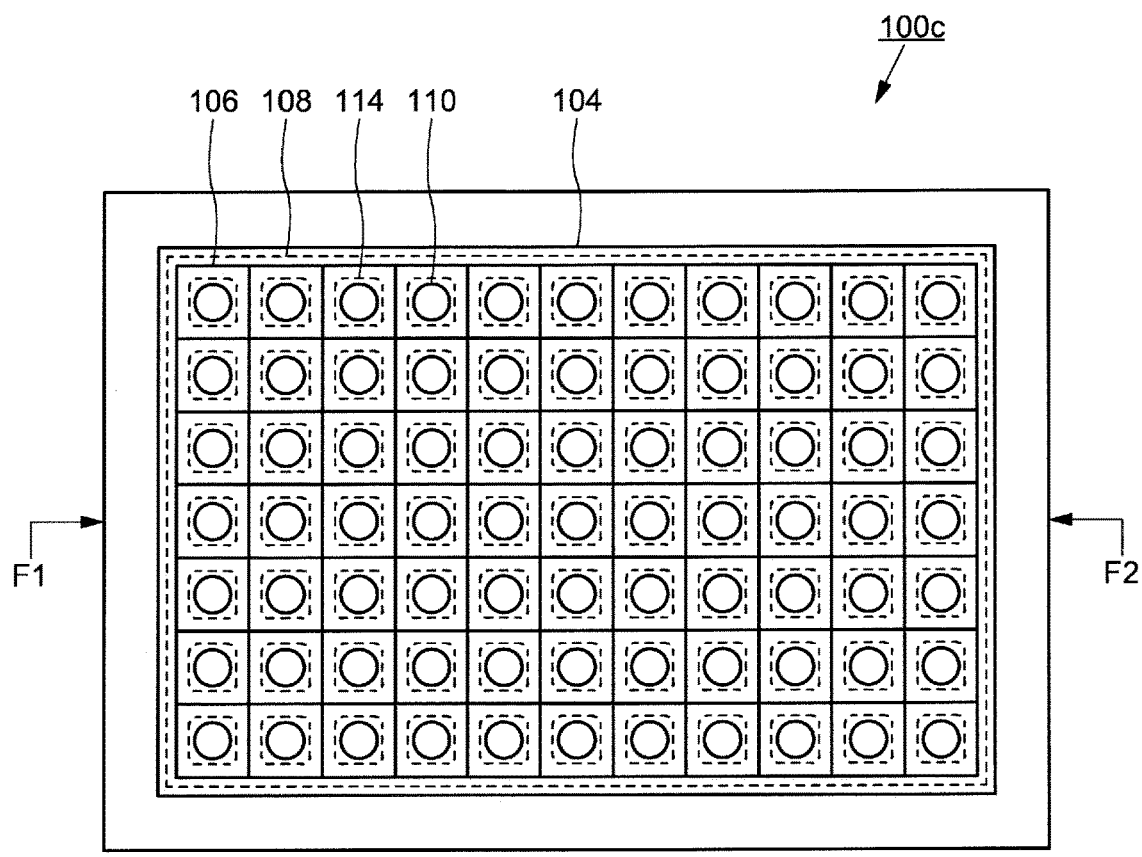
FIG. 12A shows a schematic plan view of an optical sensor according to an embodiment of the present invention.
Figure 12B:
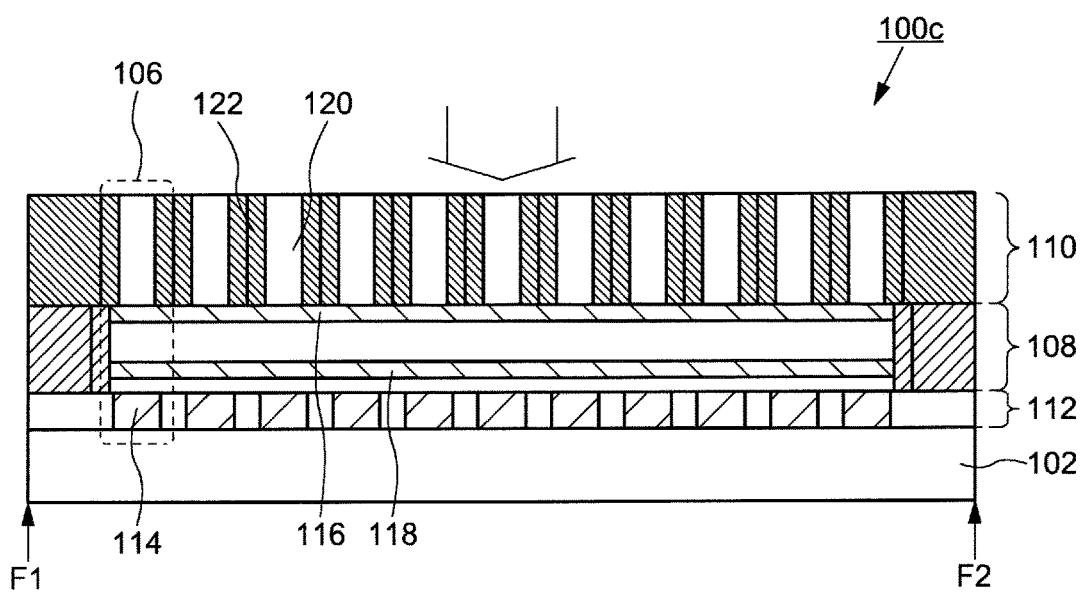
FIG. 12B is a schematic cross-sectional view of an optical sensor according to an embodiment of the present invention, and shows a cross-sectional structure corresponding to F1-F2 shown in FIG. 12A.

FIG. 12A shows a schematic plan view of an optical sensor 100c according to the present embodiment, and FIG. 12B shows a schematic cross-sectional view corresponding to F1-F2 shown in the schematic plan view. The optical sensor 100c has a configuration in which the collimating element 110, the interferometer 108, and the photoelectric conversion element 114 are arranged from the light incident side. According to such an arrangement, since the incident light is adjusted to parallel beams by the collimating element 110 and incident on the interferometer 108, the color purity of the spectrally dispersed light can be enhanced, and an image with higher accuracy can be obtained.

The optical sensor 100c is similar to that of the second embodiment except that the collimating element 110 is arranged differently, and the same advantageous effect can be obtained. The configuration of this embodiment can be appropriately combined with the optical sensor 100a of the first embodiment.

Fourth Embodiment

The optical sensors shown in the first to third embodiments can be combined with or incorporated into various devices. This embodiment shows an example of a display device in which an optical sensor and a display panel are combined.

Figure 13:
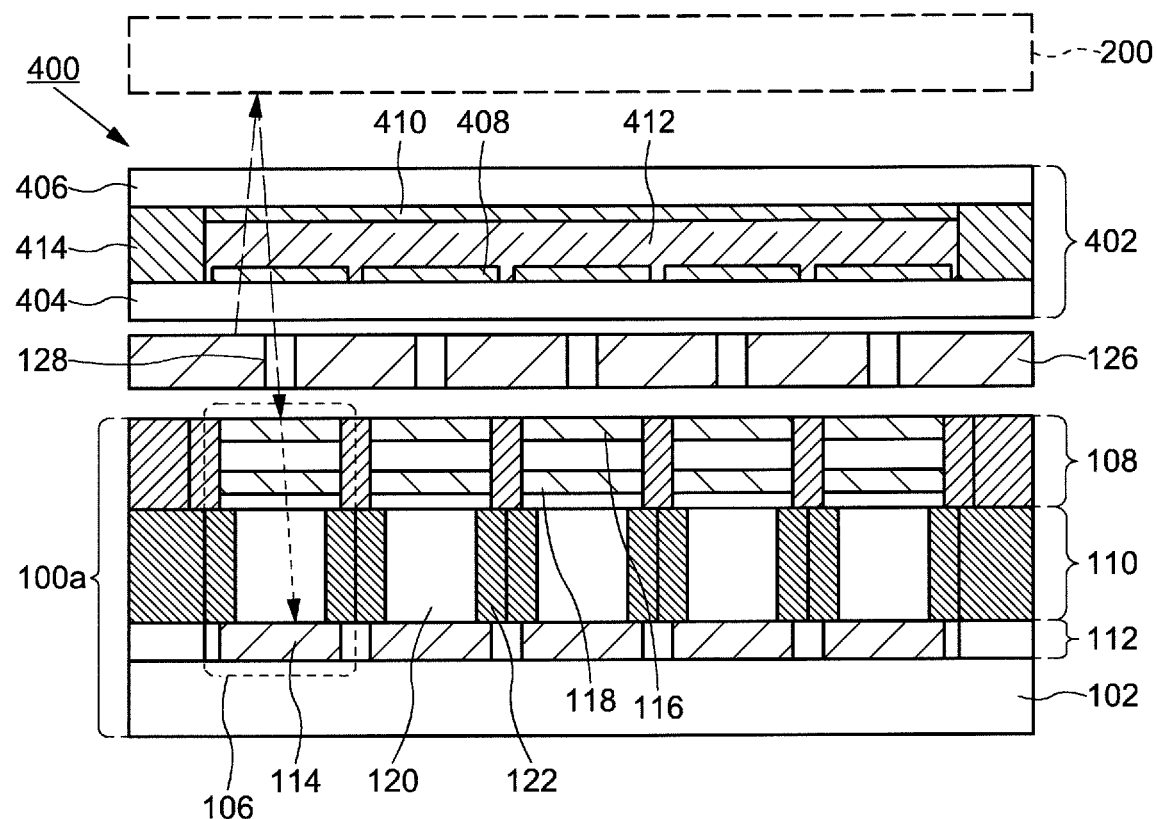
FIG. 13 shows a configuration of a display device according to an embodiment of the present invention.

FIG. 13 shows an example of a display device 400 according to the present embodiment. The display device 400 includes a display panel 402, the lighting unit 126, and the optical sensor 100a. The display panel 402 is arranged on a front side (visual recognition side) and the optical sensor 100a is arranged on a rear side of the display device 400. The lighting unit 126 is arranged between the display panel 402 and the optical sensor 100a.

The display panel 402 has a configuration in which a first substrate 404 disposed with a pixel electrode 408 and a second substrate 406 disposed with a counter electrode 410 are oppositely arranged with a gap, and a liquid crystal layer 412 is disposed between them. The first substrate 404 and the second substrate 406 are fixed by a sealing material 414. The display panel 402 having such a configuration is also referred to as a so called liquid crystal display panel, and has a function in which the lighting unit 126 is disposed on the back side and an image is displayed by using the electro-optical effect of the liquid crystal.

The optical sensor 100a has the same configuration as that shown in the first embodiment. That is, the optical sensor 100a has the structure in which the interferometer 108, the collimating element 110, and the photo sensor 112 overlap. The optical sensor 100a has a configuration similar to that shown in the first embodiment. That is, the optical sensor 100a has a configuration in which the interferometer 108, the collimating element 110, and the photo sensor 112 are superposed on each other. The optical sensor 100a obtains information of the object 200 through the display panel 402.

Figure 14A:
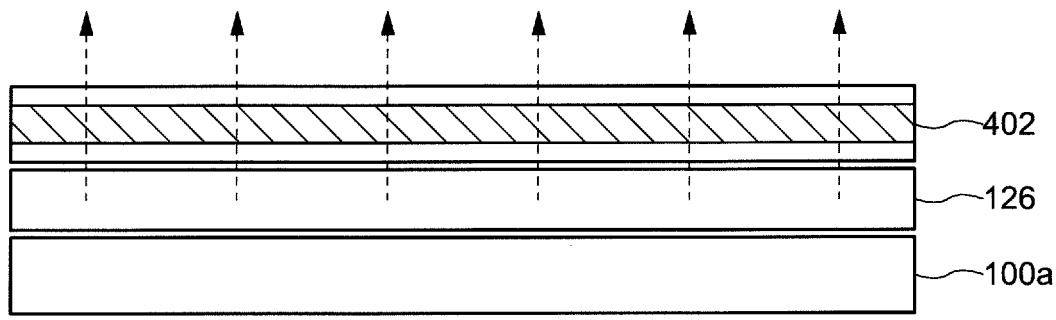
FIG. 14A shows a display mode that is one of the operation modes of a display device according to an embodiment of the present invention.
Figure 14B:
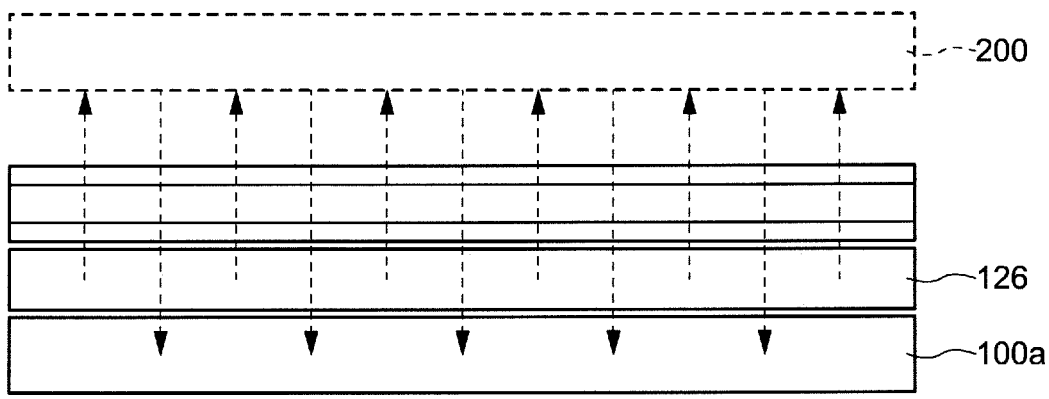
FIG. 14B shows a sensing mode that is one of the operation modes of the display device according to an embodiment of the present invention.
Figure 14C:
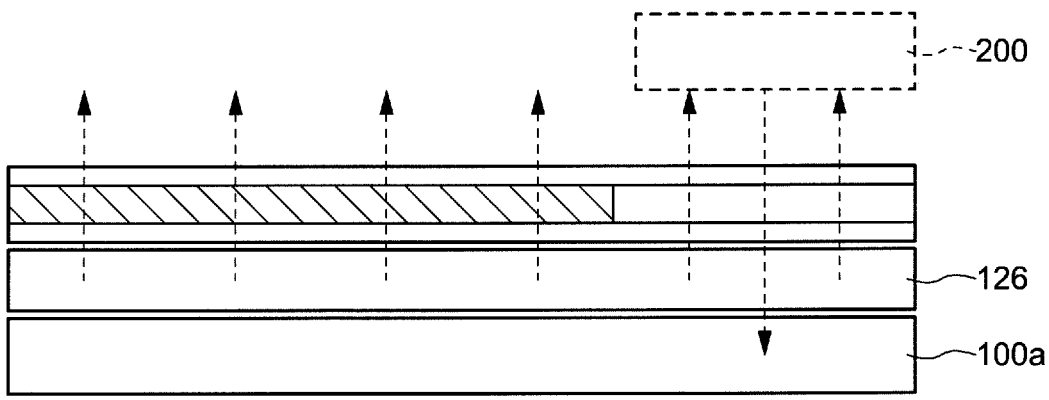
FIG. 14C shows a hybrid mode that is one of the operation modes of a display device according to an embodiment of the present invention.

FIG. 14A, FIG. 14B, and FIG. 14C are schematic views for explaining the operation state of the display device 400 according to the present embodiment. FIG. 14A, FIG. 14B, and FIG. 14C are simplified diagrams showing a structure in which the display panel 402, the lighting unit 126, and the optical sensor 100a overlap as described with reference to FIG. 13.

The display device 400 has at least two operation modes: a display mode (FIG. 14A) in which an image is displayed by the display panel 402, and a sensing mode (FIG. 14B) in which the object 200 is sensed by the optical sensor 100a. The display mode shown in FIG. 14A displays an image by the display panel 402 and the lighting unit 126 as described above. Since only an image is displayed in the display mode, the operation of the optical sensor 100a may be stopped.

The sensing mode shown in FIG. 14B operates the optical sensor 100a so that the reflected light from the object 200 of the light emitted from the lighting unit 126 is incident through the through hole 128, the incident light is spectrally dispersed by the interferometer 108, adjusted to parallel light by the collimating element 110, and changed to an electric signal by the photo sensor 112. In this case, since the light emitted from the lighting unit 126 and the light reflected from the object need to be transmitted through the display panel 402, the display panel 402 is controlled in the transmission mode (white display state).

Thus, the display device 400 can display an image and function as a sensor by having two operation modes. The display device 400 can control the operation of the interferometer 108 individually corresponding to the pixels 106 in the configuration of the optical sensor 100a. As a result, as shown in FIG. 14C, the hybrid mode can be realized by displaying an image on a part of the display panel (operation as a display mode) and using the other part for sensing the object 200 (operation in the sensing mode). According to such a hybrid mode, biometric authentication can be integrated in a tablet computer.

As shown in FIG. 13, the display device 400 may have a configuration in which substantially the entire surface of the display panel 402 and substantially the entire surface of the optical sensor 100a overlap, and the optical sensor 100a may be arranged so as to overlap a part of the display panel 402 (in other words, in a plan view, the size of the optical sensor 100a may be smaller than that of the display panel 402).

The display device according to the present embodiment has the sensing function for detecting the information of the object in addition to the display function, and the sensing function can select the wavelength of the light detected by the optical sensor by the interferometer, and it is possible to sense a plurality of information of an object without lowering resolution by using the photo sensor having light sensitivity in a wide wavelength band.

Although this embodiment shows a configuration in which the optical sensor 100a according to the first embodiment is used as the optical sensor, the display device 400 is not limited thereto, and the optical sensor according to the second and third embodiments may be used. The display panel 402 is not limited to a liquid crystal panel, and can be replaced with an LED display panel having LED chips arranged in pixels or an organic EL display panel.

What is claimed is:

1. An optical sensor comprising:
   at least one interferometer arranged on a first surface of a first substrate, the at least one interferometer including a pair of semi-transparent mirrors spaced apart and oppositely arranged, and at least one position of the pair of semi-transparent mirrors can be displaced;
   at least one collimating element arranged on a second surface opposite to the first surface of the first substrate, the at least one collimating element overlapping the at least one interferometer; and
   at least one photoelectric conversion element arranged on a second substrate, the at least one photoelectric conversion element having sensitivity in visible and near infrared light bands and receiving light passing through the at least one interferometer and the at least one collimating element, wherein
   the at least one photoelectric conversion element is covered by a planarizing layer,
   the at least one collimating element and the at least one photoelectric conversion element are between the first substrate and the second substrate, and
   the at least one collimating element is directly in contact with the planarizing layer.

2. The optical sensor according to claim 1, wherein the at least one photoelectric conversion element comprises a plurality of photoelectric conversion elements, and the at least one interferometer is arranged for each of the plurality of photoelectric conversion elements.

3. The optical sensor according to claim 1, wherein the at least one interferometer comprises a plurality of interferometers, and the at least one photoelectric conversion element comprises a plurality of photoelectric conversion elements, and the plurality of interferometers and the plurality of photoelectric conversion elements are arranged in a first direction and a second direction intersecting the first direction.

4. The optical sensor according to claim 1, wherein the at least one interferometer can change the wavelength of transmitted light relative to an incident light.

5. The optical sensor according to claim 1, wherein the at least one interferometer is a tunable Fabry-Perot interferometer.

6. The optical sensor according to claim 1, wherein the at least one interferometer comprises a MEMS structure.

7. The optical sensor according to claim 1, wherein the at least one collimating element is laminated with an absorption layer having a through hole and a transparent resin layer.

8. The optical sensor according to claim 1, wherein the at least one collimating element includes a light guide pillar and a light shielding layer surrounding the light guide pillar.

9. The optical sensor according to claim 1, further comprising a lighting unit,
   wherein the lighting unit is arranged on an opposite side of the side on which the at least one photoelectric conversion element of the at least one interferometer is arranged.

10. A display device comprising:
    an optical sensor; and
    a display panel overlapping the optical sensor,
    wherein the optical sensor includes:
       at least one interferometer arranged on a first surface of a first substrate, the at least one interferometer including a pair of semi-transparent mirrors spaced apart and oppositely arranged, and at least one position of the pair of semi-transparent mirrors can be displaced;
       at least one collimating element arranged on a second surface opposite to the first surface of the first substrate, the at least one collimating element overlapping the at least one interferometer; and
       at least one photoelectric conversion element formed on a second substrate, the at least one photoelectric conversion element having sensitivity in visible and near infrared light bands and receiving light passing through the interferometer and the collimating element,
    the at least one photoelectric conversion element is covered by a planarizing layer,
    the at least one collimating element and the at least one photoelectric conversion element are between the first substrate and the second substrate, and
    the at least one collimating element is directly in contact with the planarizing layer, and
    the display panel is located on a side of the at least one interferometer of the optical sensor.

11. The display device according to claim 10, wherein the display panel displays an image in a display mode,
    wherein the optical sensor performs sensing when an entire surface of the display panel is in a transmissive state in a first sensing mode, and
    wherein the optical sensor performs sensing with a first region of the display panel as a transmissive state in a second sensing mode, and the display panel displays an image in a second region other than the first region.

12. The display device according to claim 10, wherein the display panel is a liquid crystal display panel, an organic EL display panel, or an LED display panel.

13. The display device according to claim 10, wherein the at least one photoelectric conversion element comprises a plurality of photoelectric conversion elements, and the at least one interferometer is arranged for each of the plurality of photoelectric conversion elements.

14. The display device according to claim 10, wherein the at least one interferometer comprises a plurality of interferometers, and the at least one photoelectric conversion element comprises a plurality of photoelectric conversion elements, and the plurality of interferometers and the plurality of photoelectric conversion elements are arranged in a first direction and a second direction intersecting the first direction.

15. The display device according to claim 10, wherein the at least one interferometer can change the wavelength of transmitted light relative to an incident light.

16. The display device according to claim 10, wherein the at least one interferometer is a tunable Fabry-Perot interferometer.

17. The display device according to claim 10, wherein the at least one interferometer comprises a MEMS structure.

18. The display device according to claim 10, wherein the at least one collimating element is laminated with an absorption layer having a through hole and a transparent resin layer.

19. The display device according to claim 10, wherein the at least one collimating element includes a light guide pillar and a light shielding layer surrounding the light guide pillar.

20. The display device according to claim 10, further comprising a lighting unit, wherein the lighting unit is arranged on an opposite side of the side on which the at least one photoelectric conversion element of the at least one interferometer is arranged.

* * * * *